(No Model.)

H. D. THATCHER & H. P. BARNHART.
FASTENING DEVICE FOR BOTTLES.

No. 340,833. Patented Apr. 27, 1886.

ATTEST-
J. Henry Kaiser
Harry L. Amer

INVENTOR-
Hervey Dexter Thatcher
Harvey Patten Barnhart

UNITED STATES PATENT OFFICE.

HERVEY DEXTER THATCHER AND HARVEY PATTEN BARNHART, OF POTSDAM, NEW YORK.

FASTENING DEVICE FOR BOTTLES.

SPECIFICATION forming part of Letters Patent No. 340,833, dated April 27, 1886.

Application filed December 23, 1885. Serial No. 186,519. (No model.)

*To all whom it may concern:*

Be it known that we, HERVEY DEXTER THATCHER and HARVEY PATTEN BARNHART, citizens of the United States, residing at Potsdam, in the county of St. Lawrence and State of New York, have invented certain new and useful Improvements in Fastening Means for Milk-Bottles and Similar Vessels; and we do hereby declare that the following specification, taken in connection with the drawings furnished herewith and forming a part of the same, is a full, clear, and exact description thereof.

Bottles, jars, and cans of glass and other materials have been heretofore provided in great variety, having various means for fastening the mouths of the same to secure their contents from the action of the air or from accidental escape, both while in transit and while in a state of rest, but none with which we are familiar are free from objection. If the mouth of the vessel is made so secure that contact with the air is impossible, or the closure of the same so perfect that the contents cannot escape by accident, it is generally at the sacrifice of simplicity and readiness of operation in the fastening means. Complicated devices, difficult of manipulation and easily disordered, are common.

Our invention has relation to a jar or bottle for daily use in delivering to families a stated quantity of milk of a tested degree of purity and quality. Being thus for a specified purpose, it must be possessed of certain characteristic features. It must especially be capable of easy filling and emptying, as well as of complete and most thorough cleansing, for it is well known that the slightest trace of fermented or impure matter coming into contact with pure milk will in a very brief space of time affect the entire mass. A bottle for this use, therefore, must be open-mouthed, free from all dirt-retaining cavities or crevices, such as the ordinary lugs, screw-threads, and indentations of the common vessels of commerce invariably produce. It must be capable of secure closing and ready opening.

With these objects in view, our invention consists of a vessel with an open mouth of circular form provided with imperforate openings or eyes upon the outer wall of the neck, a cover for the said vessel, and a bail pivoted within the said eyes and held in engagement therewith by means of a tie-bar or chord, which spans the arc of the said bail within its extremities; and it furthermore consists in improvements hereinafter described, and particularly pointed out in the claims.

Figure 1:
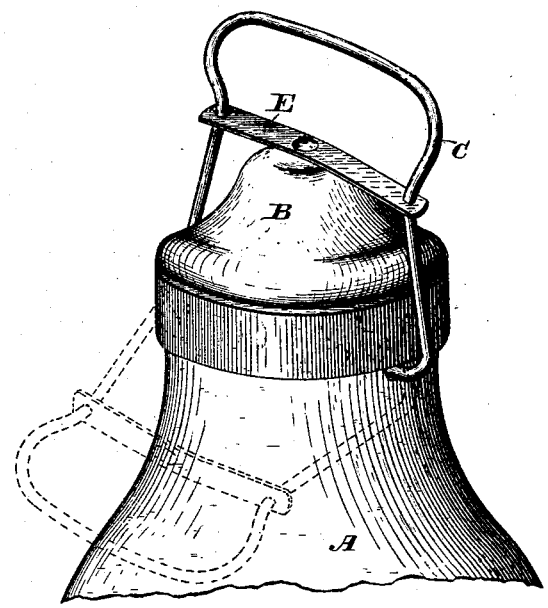
Figure 2:
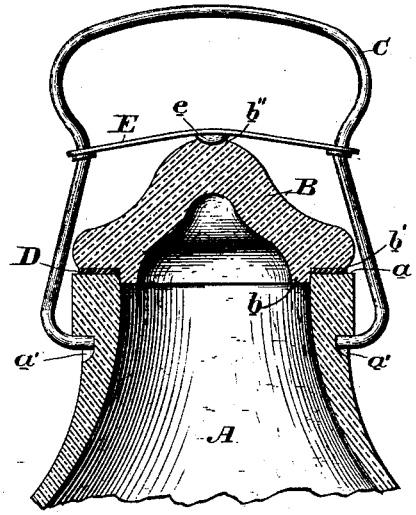

In the accompanying drawings, Figure 1 is a perspective view of a bottle having our improvements, the neck and fastening only being shown. Fig. 2 is a view in vertical section of the same.

A represents the vessel, of any desired construction, size, or shape, made preferably of glass or other vitreous material, and provided with a cover, B. The mouth of the vessel is truly circular, and finished upon the inside smoothly and without interruption of surface. The cover is provided with an internal peripheral flange or rim, $b$, adapted to fit exactly within the mouth of the vessel and direct the smooth bearing-face $b'$ into close contact with the smooth upper bearing-surface, $a$, of the mouth. To exclude air, an annulus or gasket, D, of rubber or other packing, may be placed between the surfaces $a$ and $b'$ before the cover is locked into its seat upon the vessel's mouth, or these surfaces may preferably be given a ground-glass finish.

The cover rises from its bearing-surface to a blunt or rounded apex, within or upon which is centrally formed a slight depression or concavity, $b''$. The cover thus provided is securely locked into its seat by a permanently-pivoted spring-wire bail, C, set at each of its extremities in imperforate openings or eyes $a'$ $a'$, sunk within the outer wall of the vessel's neck and upon antipodal points thereof. With the inturned ends of the bail sprung thus into their respective sockets within the outer neck of the vessel the body of the bail is carried up freely above the cover to form a handle. At points upon the bail, slightly below the horizontal plane which passes through the apex of the cover, we secure a moderately-stiff flat steel spring, E, provided upon its under surface with the nib or projection $e$ in a central position, to register with the concavity in the apex of the cover.

The operation of our device is as follows:

The vessel being uncovered, with the bail dropped into the position shown in dotted lines in Fig. 1, the gasket is laid upon the smooth open mouth and the cover dropped into its seat thereupon. The bail is then grasped by the handle and carried upward, describing an arc of a circle about its ends as an axis. When the projection upon the under surface of the spring-chord strikes the rounded limb of the cover, a slight pressure is sufficient to overcome the friction of the parts and the tension of the spring, whereupon the lug at once slips into position within the concavity provided therefor upon the apex of the cover.

Irrespective of its functions as a spring, the structure of the member E is that of a tie-bar or chord to hold the inturned ends of the bail within their engaging-sockets in the vessel's neck and retain them positively in position, it being found in actual practice that it is almost, if not quite, impossible to fit the ordinary bail-wire of bottles to even the slight variations present in assembling vessels and covers. If the cover varies ever so slightly and the bail goes a trifle too tight, it must be fitted to the sockets, that it may draw the cover down with a fitting tension; otherwise it will spring the pivots out of their engagement with the sockets. With the construction herein described, however, these objections are entirely obviated. The spring-chord admits of a comparatively wide degree of flexibility, thereby adjusting itself to bottles and covers having considerable variation. It has, moreover, the additional advantage that when sprung upward to its greatest extent, its tension being then at its maximum, it will tend not only to hold the cover more securely in its place upon the mouth of the bottle, but also to cause the inturned ends of the bail to grasp more closely their sockets, the distance apart of the pivots being directly proportional to the tension of the chord subtending the arc of the bail upon which they are carried. The remaining or free portion of the bail which extends above the spring thus becomes the handle, by which the vessel is not only adapted to be carried, but by which the manipulation of the entire fastening device is quickly and effectively accomplished.

It is manifest that changes in the construction of the several parts of our invention may be made without departing from the spirit thereof.

And now, therefore, having fully described our invention and the principle of its operation, what we claim as new, and desire to secure by Letters Patent of the United States, is—

1. The combination, with an open-mouthed vessel, of a cover therefor held in engagement therewith by a pivoted bail secured to the vessel, and provided with a tie-bar or chord spanning the arc of the bail within its extremities, and bearing upon the superior surface of the said cover, as set forth.

2. The combination, with an open-mouthed vessel, of a cover therefor held in engagement therewith by a bail pivoted to the vessel, and provided with an elastic or spring tie-bar or chord spanning the arc of the bail within its extremities, and bearing upon the superior surface of the said cover, as set forth.

3. The combination, with an open-mouthed vessel, of a cover therefor provided with a concavity or depression in its superior surface, a bail pivoted to the vessel and provided with an elastic or spring tie-bar or chord for engagement with the said cover, and having a lug or projection on its inferior surface, and spanning the arc of the bail within its extremities, as set forth.

4. The combination, with the open circular-mouthed vessel A, having sockets $a'$, the circular cover B, having the flange $b$ and central concavity, $b''$, the pivoted bail C, having inturned extremities, the flat spring E, provided with the downwardly-projecting protuberance $e$, and spanning the arc of the bail between its extremities, whereby the upper portion of the bail is adapted for use as a handle, and the extremities of the bail are more securely held within their sockets when the tension of the spring is increased, as set forth.

In testimony whereof we hereunto subscribe our names this 19th day of December, 1885.

HERVEY DEXTER THATCHER.
HARVEY PATTEN BARNHART.

Witnesses:
ALBERT WILLIAM DEWEY,
GEORGE EASTON CURRIER.